United States Patent Office 3,504,258
Patented Mar. 31, 1970

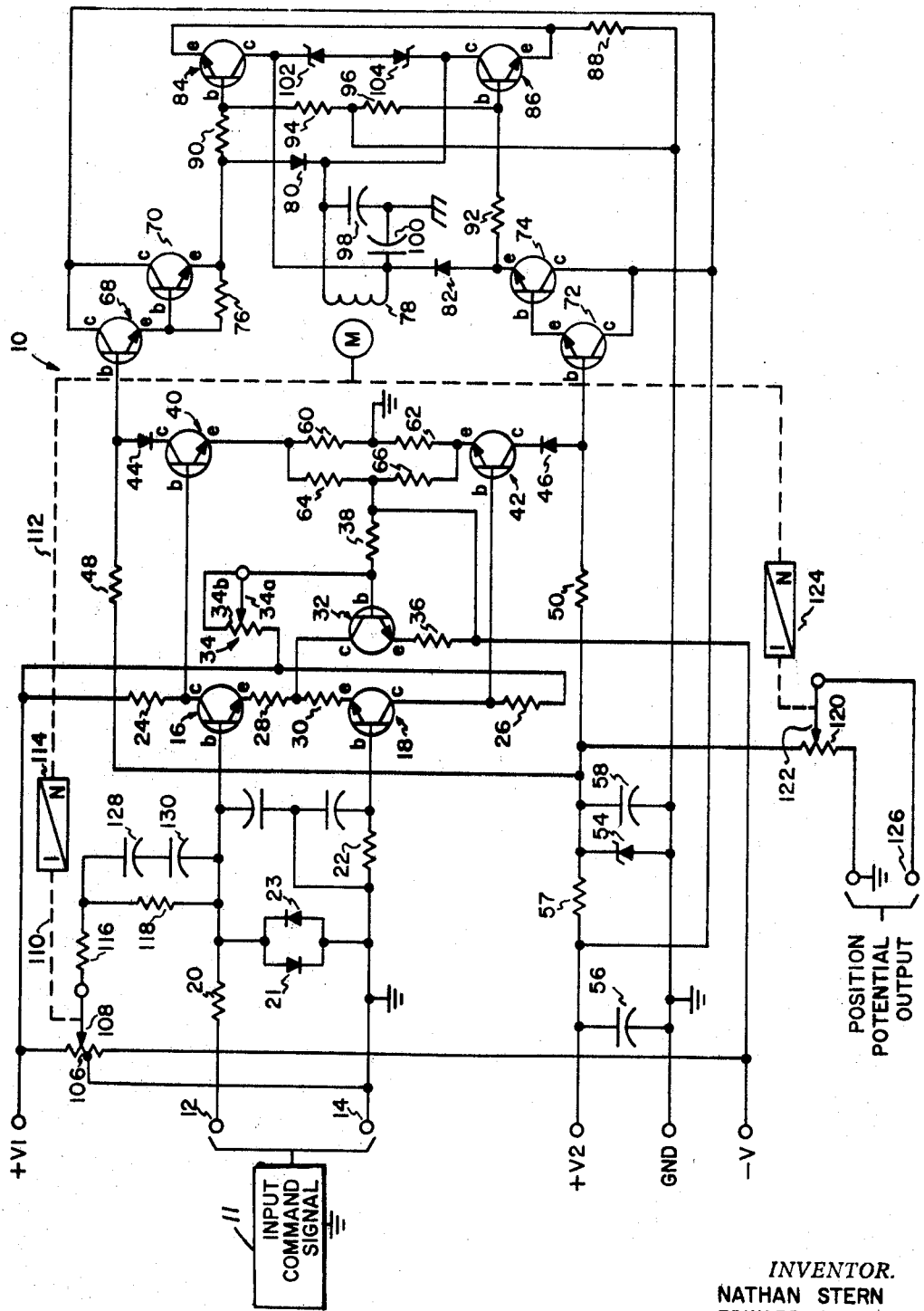

3,504,258
REVERSIBLE CURRENT CONTROL APPARATUS
Nathan Stern, Flushing, N.Y., and Edward J. Rapoza, Butler, N.J., assignors, by mesne assignments, to the United States of America as represented by the Administrator of the National Aeronautics and Space Administration
Filed July 27, 1966, Ser. No. 568,160
Int. Cl. H02p 1/18
U.S. Cl. 318—257                                                              1 Claim

ABSTRACT OF THE DISCLOSURE

A control circuit responsive to an input signal for directing current through a two-terminal control element in one direction while said input signal is positive and for directing current through the control element in the other direction while said input signal is negative.

---

This invention relates to current control circuitry and more particularly to high efficiency reversible current directing circuitry for controlling reversible motors and the like.

Control circuitry for selectively providing current of either direction through an element is well known. However, environmental and other factors frequently impose certain restrictions on such circuitry which are difficult to meet. As an example, in closed servo systems, torquing systems and the like which may be required in satellites or other space vehicles, have severe restrictions on size and weight of control components as well as others. In reverse current control circuits as heretofore provided, undue size and weight has resulted from various such requirements. In some cases, the requirement in power circuits, of potentials of both polarities, plus and minus, selectively switched to interconnect terminals of a controlled element, are required. This often necessitates additional components such as transformers which are usually of a bulky, heavy character. In other cases wherein reverse currents through a controlled element are facilitated, the circuitry includes switching elements and resistive couplings between the switching elements and the controlled element. While such circuitry in itself may be made light and compact, the great inefficiency resulting from power loss in the resistors thereof requires batteries or other power sources of considerably greater size and capacity, again adding to the bulk and weight of the entire control circuit.

Accordingly, it is a principal object of this invention to provide circuitry for directing current through a control element in either of two directions from a two terminal power potential with one of its terminals connected to ground.

It is another object of this invention to effect reverse current control by circuitry that is relatively small, light and compact.

It is another object of this invention to accomplish reversible current control effectively and with high efficiency, obviating large and heavy power sources.

In accordance with this invention, efficient reverse current control is effected by the provision of two electronic channels responsive, respectively, to different polarities of input command signals. In each channel the potentials of these signals are amplified and they control a power amplifying circuit such as an emitter follower type of circuit in the form of a Darlington pair. The outputs of the latter are coupled to direct the current to respective terminals of the controlled element and further, each such output is coupled to a control electrode of a switching device such as a transistor, the collectors of which are connected in the return circuit from the terminal of the controlled element remote from the terminal to which the subject emitter follower output providing power current is connected. In this circuit arrangement, each emitter follower output supplies both the control current and conditions an appropriate switching device to provide current return from the other terminal of the control element. The two separate channels required for the respective polarities of input signals include transistors, resistors and diodes which are light, small and dissipate very little power and, in the current reversing circuit, no high dissipation resistive elements are required, increasing the efficiency of the circuit by a very large factor.

Other and further objects and advantages will appear from the following detailed description of the invention taken with the accompanying drawing in which the single figure is a schematic diagram of a typical circuit incorporating the invention.

Referring now to the drawing, 10 represents generally the entire circuit in which the reversible current control circuitry of this invention is incorporated. The circuit 10 may be used in various environments, one of which is a space vehicle and in which input command potentials the magnitude of which is proportional to a desired output position and the polarity, either positive or negative, corresponds to direction forward or reverse. Such potentials are applied as inputs to input terminals 12 and 14. Terminal 14 being connected to ground with input signal 11.

An input preamplifier circuit includes a pair of transistors 16 and 18, each being of the NPN type. These transistors are interconnected with each other and with other circuit components to respectively translate positive and negative input signals. For receiving the input signals to the circuit 10, input terminal 12 is connected through a resistor 20 to the base of transistor 16. A resistor 22 is interconnected between the base b of transistor 18 and ground.

To prevent the application of excessive potentials to the bases b and b of transistors 16 and 18, respectively, a pair of diodes 21 and 23, oppositely poled, are connected directly between base b of transistor 16 and ground. These diodes present sufficient forward bias resistance up to potentials which are capable of producing saturation current in the respective transistors in response to the application of such potentials to the transistor bases. As an example, the diodes 21 and 23 may present substantial forward biasing resistance up to .5 volt and very low resistance to potentials greater than .5 volt. The input while above .5 volt will induce a saturated output compelling the output drive member to move at full capacity in a direction as to satisfy the command. Once close proximity of the desired output position is achieved, the input base voltage will drop below .5 volt and proportionally, in correspondence to the output motion, to zero. Thus, the diodes allow full useful signal to be applied and prevent excessive signal application to the input circuitry.

The collector potential of the transistors 16 and 18 are connected through respective resistors 24 and 26 to a source of positive potential, +V1. The emitters $e$ and $e$ of transistors 16 and 18, respectively, are connected through respective resistors 28 and 30 to the collector $c$ of transistor 32 which acts as a constant current source. For controlling the current through transistor 32, a potentiometer 34 is provided and an adjustable arm 34a of the potentiometer is connected to base $b$ of transistor 32. A potentiometer resistive element 34b is provided and one end thereof is connected to positive potential source +V1. The arm 34a is adjustable to contact the resistive element 34b along its length to select and apply different values of biasing potential to base $b$ of transistor 32. The emitter $e$ and base $b$ of transistor 32 are connected through respective resistors 36 and 38 to a source of negative potential —V.

In the quiescent condition of the circuit 10, that is, with no input signal applied to input terminal 12, the circuit as thus far described is balanced to produce zero output. The potentiometer 34 is adjustable to effect this result. In such a quiescent condition, each of the transistors 16 and 18 are in a low state of conduction and the aggregate current through these transistors passes through constant current transistor 32.

In response to input signals, however, one of the transistors 16 or 18 conducts much more heavily and the other assumes a state of correspondingly low conduction. Positive input signals render the transistor 16 more conductive and transistor 18 correspondingly less conductive while negative incoming signals render transistor 16 less conductive and, therefore, transistor 18 more conductive.

The signals translated by transistors 16 and 18 are applied to an amplifying stage including as active circuit components, the transistors 40 and 42 both of the NPN type. The collectors $c$ and $c$ of transistors 16 and 18, respectively, are directly connected to respective bases $b$ and $b$ of transistors 40 and 42 for receiving the translated signals. Operating potentials for collectors $c$ and $c$ of the transistors 40 and 42, respectively, are applied through respective diodes 44 and 46 and respective load resistors 48 and 50 from a direct potential source +V2. Regulation is preferably provided for potential V2 by a series connected resistor 57 and a Zener diode 54 connected between the junction of resistors 50 and 57 and ground. Elimination of electronic noise and filtering is provided by capacitors 56 and 58 connected across source V2 and across Zener diode 54, respectively. The diodes 44 and 46 are effective in providing protection to the transistors 40 and 42 against surges of negative potential as may appear on the +V supply line.

The emitters $e$ and $e$ of transistors 40 and 42, respectively, are connected through respective resistors 60 and 62 to ground. A further pair of serially connected resistors 64 and 66 are connected between emitters $e$ and $e$ of respective transistors 40 and 42 and the junction between these resistors is connected to negative potential source, —V.

The signals amplified in the just described stage are applied to the input of a power amplifying stage. In this stage two transistors in each of two sets are interconnected to form a Darlington pair. The first Darlington pair is formed by a set of transistors 68 and 70 each of the NPN type. The base $b$ of transistor 68 forms the input to the pair and this base $b$ is connected to the junction between diode 44 and resistor 48 to receive the amplified signal appearing at this junction. Emitter $e$ of transistor 68 is connected to base $b$ of transistor 70. The collectors $c$ and $c$ of respective transistors 68 and 70 are joined and connected to positive potential source +V2. A resistor 76 interconnects base $b$ and emitter $e$ of transistor 70. The Darlington pair, as described, is effective in the manner of an emitter follower stage to provide current amplification. In the pair, the current passed by transistor 70 is many times as great as that passed by transistor 68.

The second Darlington pair is formed by transistors 72 and 74 each of the NPN type and being interconnected in a manner similar to transistors 68 and 70. The base of transistor 72 is connected to the junction between diode 46 and resistor 50 to receive amplified signals appearing across resistor 50. Emitter $e$ of transistor 72 is connected to base $b$ of transistors 74 and collectors $c$ and $c$ of respective transistors 72 and 74 are interconnected and connected to positive potential source +V2. The current carrying capability of transistor 74 is many times that of transistor 72 and in this circuit, transistors 74 conducts currents several times the value of transistor 72.

A reversible motor M is provided with a winding 78. In a manner well known, the direction of rotation of the armature of a direct current motor may be controlled by controlling the direction of current in the winding, if the direction of flux of the field remains the same. For providing current to the winding 78, the emitters $e$ and $e$ of transistors 70 and 74, respectively, are connected through respective diodes 80 and 82 to respective ends of the winding 78. For completing such current circuits for the winding 78 are a pair of switching transistors 84 and 86, each of the NPN type. The collectors $c$ and $c$ of transistors 84 and 86, respectively, are connected to respective ends of the winding 78 and the emitters $e$ and $e$ of transistors 84 and 86, respectively, are conducted through a resistor 88 to ground. For controlling conduction in these transistors 84 and 86, their respective bases $b$ and $b$ are connected through respective coupling resistors 90 and 92 to emitters $e$ and $e$ of transistors 72 and 74, respectively. The potentials appearing at these respective emitters thus control conduction in the corresponding switching transistors. For proper biasing, the bases $b$ and $b$ of transistors 84 and 86, respectively, are connected through respective resistors 94 and 96 to ground providing leakage protection.

According to a feature of this invention, the various components, as described, are proportioned so that in response to a signal applied to one or the other of the channels of the circuit 10 it is effective to cause conduction in the corresponding Darlington pair of transistors. Such conduction performs two essential results. Firstly, current is supplied to the winding 78 and secondly, the potential, at the output of the current producing Darlington pair, switches "on" the appropriate switching transistor which forms the current return circuit for the winding 78. To clarify this point by an example, it is assumed that the incoming command signal is positive producing conduction in transistor 16, lowering conduction in transistor 40 and causing the Darlington pair 68 and 70 to conduct heavily. The increased potential appearing at emitter $e$ of transistor 70 is impressed upon base $b$ of transistor 84 through resistor 90, rendering this transistor conductive. Current is passed from source +V2 through transistors 68 and 70, from emitter $e$ of transistor 70 through diode 80, through the motor winding 78, from top to bottom as viewed in the drawing, to collector $c$ of transistor 84, through transistor 84 to emitter of transistor 84 and through resistor 88 to ground return. It is noted that while transistor 84 is rendered conducting the base $b$ of transistor 86 receives no potential tending to produce conduction therein. Moreover, during the conduction of transistor 84, the return current from this transistor which passes through resistor 88 produces a potential which is applied to emitter $e$ of transistor 86 tending to further render this latter transistor nonconducting. This imparts stability to the circuit in assuring that due to spurious potentials, the winding 78 is not short circuited by the conduction of transistor 86.

In response to a negative input signal, transistor 18 becomes highly conductive, conduction in transistor 42 is reduced and the Darlington pair 72 and 74 becomes highly conducting. In this case, current is passed in a circuit including the Darlington pair 72 and 74, diode 82, winding 78, transistor 86 and resistor 88. In a manner entirely similar to that described hereinabove, transistor 86 is conditioned for conduction by the increased potential at emitter *e* of transistor 74 and the potential drop across resistor 88 in this case is effective to bias transistor 84 to assure nonconduction therein.

Accordingly, it is noted that by the dual action of the potential appearing at the output of the Darlington pair, control of forward and reverse current through winding 78 is effected by a simple circuit of low power loss and requiring only one polarity of power current.

For preventing any oscillations which may tend to occur in the power circuit portion of circuit 10, a pair of capacitors 98 and 100 are connected between respective ends of winding 78 and ground. These have the effect of providing a low input path to ground for such oscillation. The diodes 80 and 82 are also effective in interrupting oscillation currents by blocking one-half cycle portion of these currents.

Damage to the Darlington pair transistors by excessive potentials, as may develop during reversal switching, is prevented by the Zener diodes 102 and 104 connected across the armature winding 78. Because the counter electromotive force developed in the armature winding during its operation as a motor, on sudden reversal of applied potential, becomes additive with such applied potential, unusually high potentials may appear and be destructive of certain circuit components such as the Darlington pair transistors. The Zener diodes, which are potential regulating, present high resistance to potentials below a certain value and low resistance to potentials above such value. These are selected to break down and allow heavy current at potentials slightly greater than the potential normally applied to the motor windings to prevent excessive potentials across such armature on such sudden reversals. For this purpose the Zener diodes possess sufficient inherent resistance to obviate added resistors.

For bringing the circuit 10 to a null, a potentiometer feedback circuit is provided. A resistive element 106 has its ends connected to potential sources +V1 and —V and an intermediate point of this resistive element is connected to ground. An adjustable arm 108 for contacting element 106 along its length is provided and a mechanical coupling as represented by the dotted lines 110 and 112 is established between the armature of motor M and this arm. Suitable speed reduction gearing 114 may be provided as desired. Thus, as the motor M is driven in response to an input signal, the arm 108 is repositioned along resistance element 106. The arm 108 is connected through series resistors 116 and 118 to the base *b* of transistor 16 so as to apply the potential selected by the arm to the base. The mechanical coupling is such as to reposition arm in such a direction along element 106 so as to apply a potential to base *b* of transistor 16 in such a polarity as to counter the input signal potential. Thus, the arm is driven until the input signal and potential selected by the arm are equal and opposite and the motor drive is terminated.

For providing output potentials to a remote location and indicative of the extent of the rotation of motor M to reach a null, another potentiometer circuit is provided. This circuit includes a resistive element 120 connected between potential source +V2 and ground and an arm 122 adjustable to contact element 120 along its length. The arm 122 is also mechanically coupled through speed reduction gearing 124 to the armature of motor M so as to be driven in unison with arm 108. Thus, the potential selected by the arm 122 and applied to an output terminal 126 is an indication of the extent of motor drive.

The frequency response characteristics of the system may be controlled by capacitance across resistor 118. A pair of serially connected capacitors 128 and 130 connected across this resistor, together with resistor 118 and 20, establish a particular response characteristic.

While the present invention has been described in a preferred embodiment, it will be obvious to those skilled in the art that various modifications can be made therein within the scope of the invention, and it is intended that the appended claim cover all such modifications.

What is claimed is:

1. A control circuit for directing current through a two-terminal control element from a power potential having its negative terminal grounded comprising:

a first current amplification means including first and second NPN transistors with their collectors connected together and with the emitter of the first connected to the base of the second; a second current amplification means including third and fourth NPN transistors with their collectors connected together and with the emitter of the third connected to the base of the fourth; means for connecting the positive terminal of said power potential through a first resistor to the base of said first transistor; through a second resistor to the base of said third transistor; and to the collectors of said first, second, third and fourth transistors;

fifth and sixth NPN transistors having their emitters connected together and then connected through a third resistor to ground;

means for connecting the emitter of said second transistor to one terminal of said two-terminal control element, to the collector of said sixth transistor, and through a fourth resistor to the base of said fifth transistor;

means for connecting the emitter of said fourth transistor to the other terminal of said two-terminal control element, to the collector of said fifth transistor, and through a fifth resistor to the base of said sixth transistor;

a seventh NPN transistor with its collector connected to the base of said first transistor and with its emitter connected through a sixth resistor to ground;

an eighth transistor with its collector connected to the base of said third transistor and with its emitter connected through a seventh resistor to ground;

ninth, tenth and eleventh NPN transistors with the collector of said ninth transistor connected to the base of said seventh transistor and through an eighth resistor to a positive potential, the collector of said tenth transistor connector to the base of said eighth transistor and through a ninth resistor to said positive potential, the emitter of said ninth transistor connected through a tenth resistor to the collector of said eleventh transistor, the emitter of said tenth transistor connected through an eleventh resistor to the collector of said eleventh transistor, the emitter of said eleventh transistor connected through a twelfth resistor to a negative potential, and with a resistance network connected between said positive potential, said negative potential and the base of said eleventh transistor to provide a biasing potential for the base of the eleventh transistor;

two input terminals for receiving input command signals with one terminal connected through a thirteenth resistor to the base of said ninth transistor and with the other terminal connected to ground and through a fourteenth resistor to the base of said tenth transistor whereby when a positive signal is applied to said input terminals said ninth transistor becomes more conductive, said seventh transistor becomes less conductive, the output from said first current amplification means increases, said fifth transistor becomes conductive and current flows from the first current amplification means through the control element from said one terminal to said other terminal, through said fifth transistor and through said third resistor to ground and when a negative signal is applied to said input terminals said tenth transistor becomes more conductive said eighth transistor becomes less conductive, the output from said second current amplification means increase, said sixth transistor becomes conductive and current flows from said second current amplification means through the control element from said other terminal to said one terminal, through said sixth transistor and through said third resistor to ground.

References Cited

UNITED STATES PATENTS

| 2,846,630 | 8/1958 | Boyle et al. | 318—20.835 |
| 3,114,869 | 12/1963 | Goodwin | 318—20.427 |
| 3,375,425 | 3/1968 | Bell | 318—293 |
| 3,110,851 | 11/1963 | Plogstedt et al. | 318—257 |
| 3,233,161 | 2/1966 | Sikorra | 318—257 |

ORIS L. RADER, Primary Examiner

K. L. CROSSON, Assistant Examiner

U.S. Cl. X.R.

307—236; 318—18, 293